Feb. 2, 1965  W. B. SEIDEL  3,167,894
LIQUID SEAL FOR MACHINE TOOL MEMBERS
Filed May 8, 1962  3 Sheets-Sheet 1

INVENTOR.
WILLIAM B. SEIDEL
BY
*Howard T. Kiser*
*John F. Verhoeven*
ATTORNEYS

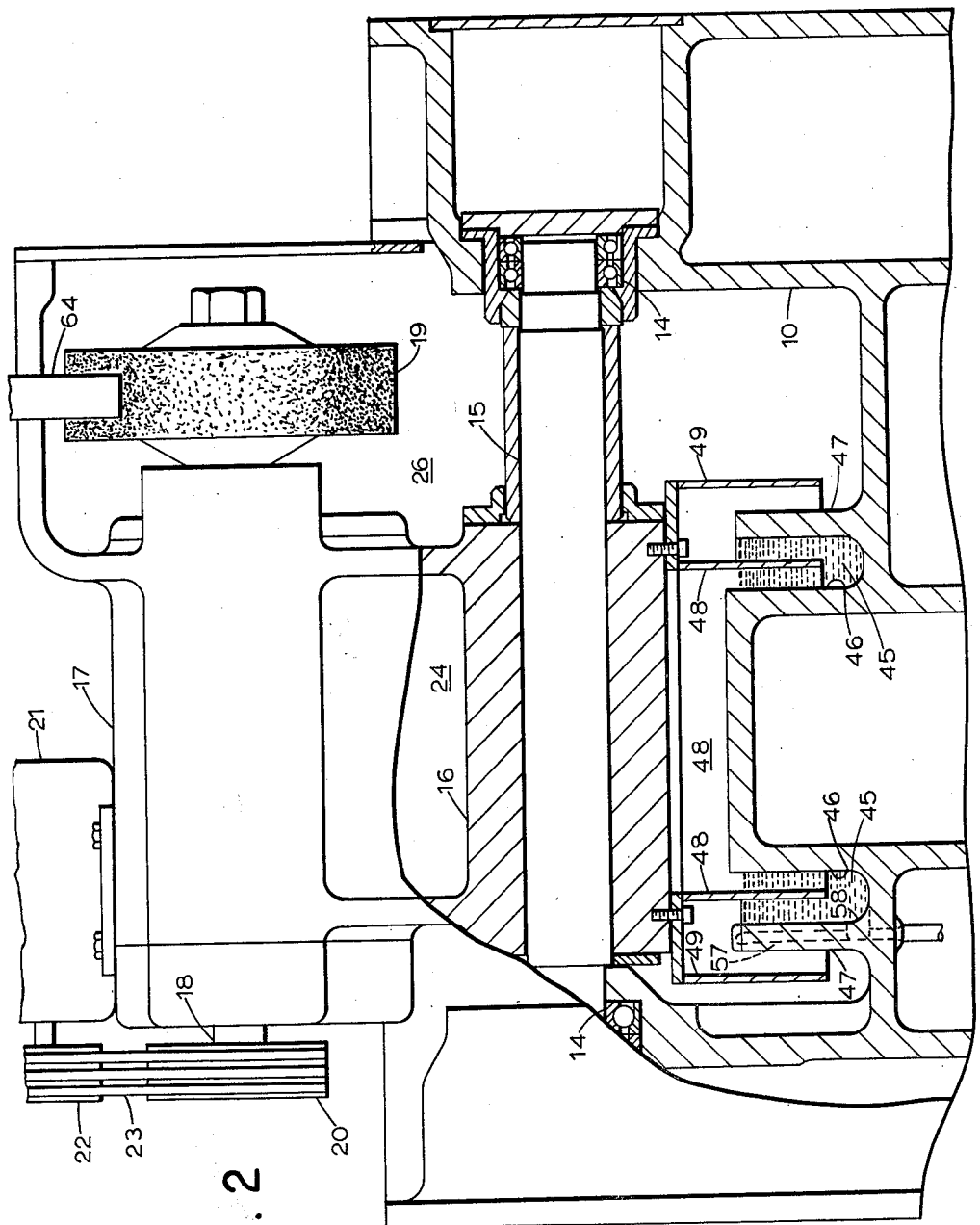

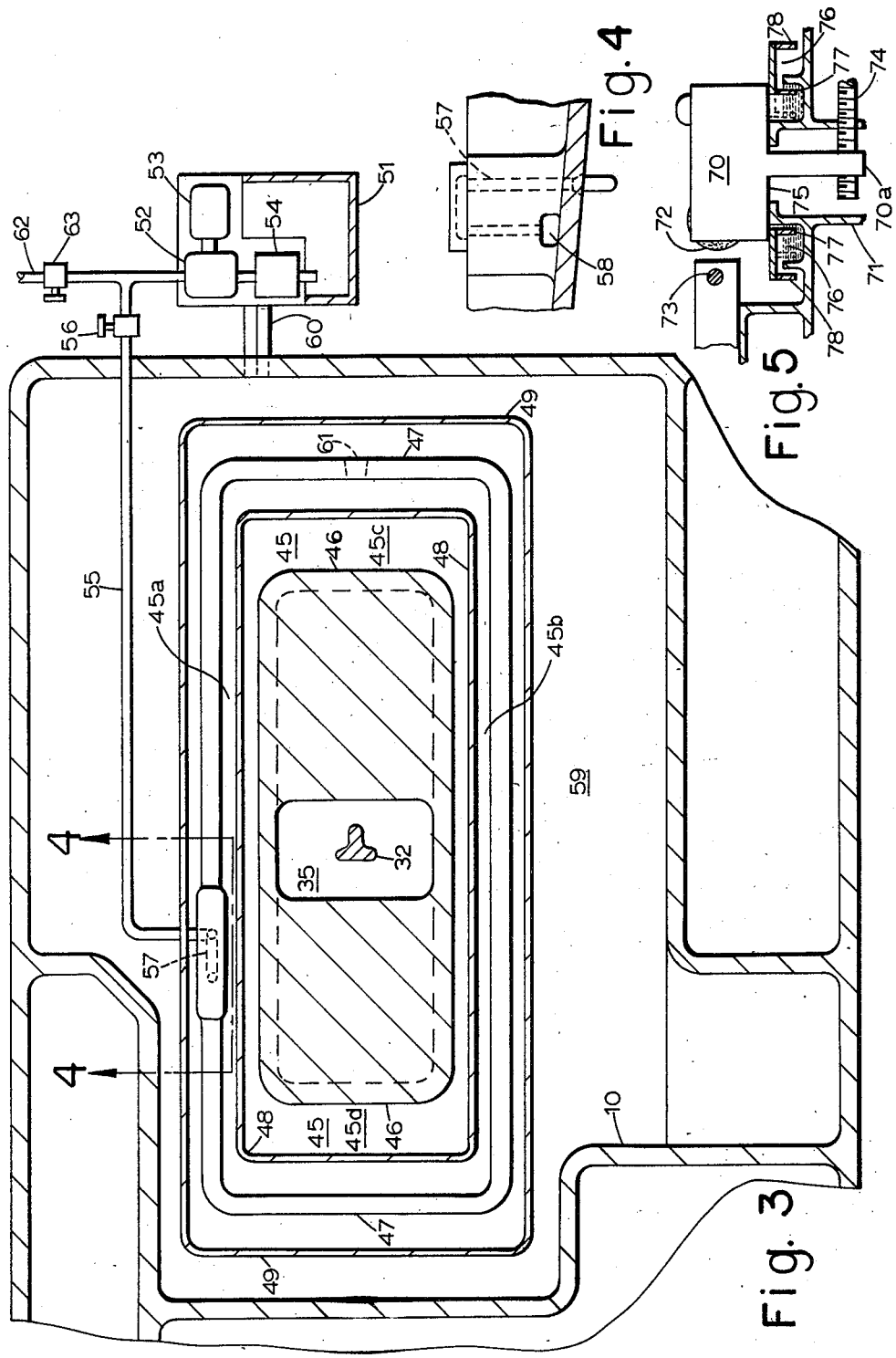

United States Patent Office 3,167,894
Patented Feb. 2, 1965

3,167,894
LIQUID SEAL FOR MACHINE TOOL MEMBERS
William B. Seidel, Cincinnati, Ohio, assignor to The Cincinnati Milling Machine Co., Cincinnati, Ohio, a corporation of Ohio
Filed May 8, 1962, Ser. No. 193,089
3 Claims. (Cl. 51—268)

The present invention relates to a machine tool and more particularly to a machine tool construction providing a sealing connection between two relatively movable members thereof.

There are many situations where it is desirable to effect a seal between two machine tool members as, for example, when mechanism extends between two relatively movable machine members in an area contaminated with grit from the machining operation. Under these circumstances an expandable seal between the two relatively movable members is required to protect any mechansim which would be subject to deterioration from the grit. Although grit can penetrate a separating boundary between two members which remain in sliding contact during their entire relative movement, the problem is particularly acute if the two relatively movable members are spaced apart during part or all of their relative movement. If the mechanism extends into one or both of the relatively movable members, the seal must effectively shield any opening through which the mechanism extends.

The expandable devices used heretofore between two relatively movable machine members include telescoping guards and accordion pleated sleeves. Both of these mechanical devices have limited application and each is subject to wear which decreases its effectiveness.

There is provided in the present invention a particularly effective liquid seal which can be used in applications where utilization of telescoping guards and accordion pleated sleeves would be awkward or impossible. Moreover, the liquid seal of the present invention is not subject to wear which would decrease its effectiveness. In brief, one of two relatively movable members, such as a base, is provided with a well, or trough, and the other member, such as a wheelhead movable relative to the base between two extreme positions, has a depending portion extending into the trough and below the level of fluid therein in any position of the wheelhead. In the preferred form of the invention, the trough and the depending portion, which defines a continuous skirt, surround an opening in the base through which motion transmitting mechanism extends so that a seal is provided between the relatively movable wheelhead and base which envelopes the mechanism and opening for protection from any contamination, such as grit from a grinding operation, in the area outside the continuous trough and skirt. Preferably, the wheelhead has a second skirt surrounding the trough to minimize the deposit of grit therein, and fluid, which may be fluid such as coolant having some other function in the machine tool, is continuously pumped from a sump into the trough to cause a continuous overflow thereof. This continuous overflow flushes out any grit which may get in the trough and a gutter is provided outside the trough to catch the overflow for return to the sump.

It is therefore one object of the present invention to provide an improved seal between machine tool members.

It is another object of the present invention to provide an improved seal between relatively movable machine tool members not subject to wear which would decrease its effectiveness.

It is still another object of the present invention to provide an improved liquid seal between relatively movable machine members adaptable for use in many applications in which mechanical seals are not suitable.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 2 is a view taken on the line 2—2 of FIG. 1 with parts broken away for clarity;

FIG. 3 is a view taken on the line 3—3 of FIG. 1;

FIG. 4 is a view taken on the line 4—4 of FIG. 3; and

FIG. 5 is a view in elevation of a different movable grinding machine wheelhead mounted on a base and sealed therewith.

Figure 1:
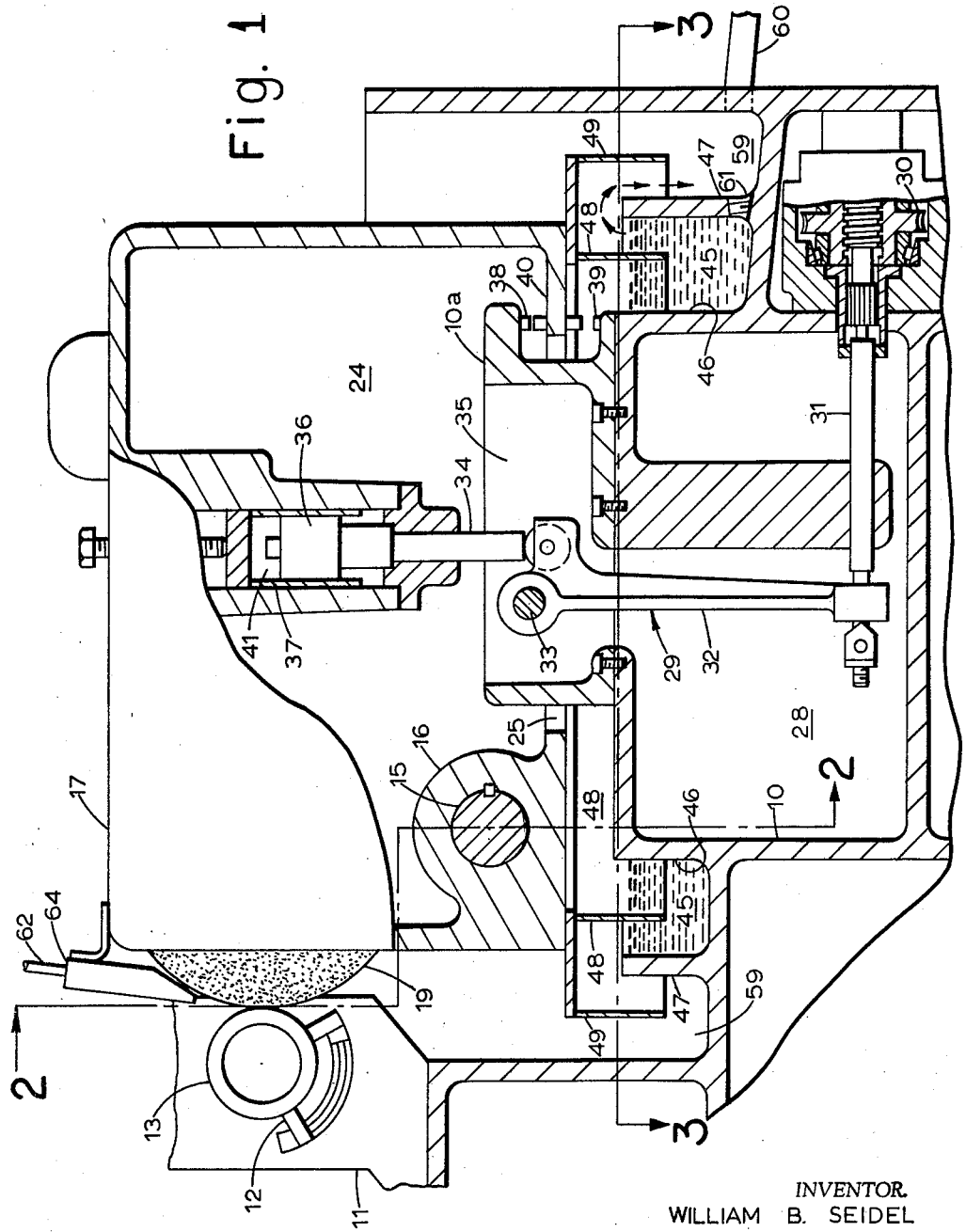
FIG. 1 is a fragmentary view, in elevation, of a movable grinding machine wheelhead mounted on a base and sealed therewith, with parts broken away for clarity.

There is shown in FIGS. 1, 2, and 3 a grinding machine having a base 10 on which is mounted a workpiece support 11. A pair of shoes 12 is secured to workpiece support 11 to hold a workpiece 13 for a grinding operation thereon by grinding wheel 19. To produce advance and retraction of the grinding wheel 19 relative to workpiece 13, motion transmitting mechanism extending between the base 10 and the grinding wheel 19 is provided. This motion transmitting mechanism includes actuating mechanism, indicated generally at 29, and a wheelhead 17 mounted on the base which defines a support member to rotatably carry the grinding wheel. As shown best in FIG. 2, bearings 14 carried in each side of the base rotatably support a pivot shaft 15 extending therebetween. Hub 16 of wheelhead 17 is keyed to pivot shaft 15 for pivotal movement of wheelhead 17 relative to the base 10.

The wheelhead 17 rotatably supports a spindle 18 on one end of which is mounted the grinding wheel 19 and on the opposite end of which is mounted the drive pulley 20. The grinding wheel is rotated by motor 21, which is mounted on top of the wheelhead, through motor pulley 22, belts 23, drive pulley 20, and spindle 18. The interior of the wheelhead has a compartment 24 which is completely enclosed except for an opening 25 at the bottom thereof. The grinding wheel 19 is mounted in a separate compartment 26 which has an opening at the forward end through which the grinding wheel extends for contact with the workpiece 13.

To effect pivotal movement of the wheelhead 17 relative to the base 10, and hence produce advance and retraction of the grinding wheel 19 relative to the workpiece 13, actuating mechanism 29 of the type shown and described in U.S. Patent 2,795,088 issued June 11, 1957, to Carl J. Schonhoft and Robert Bernhard is shown for illustrative purposes. In this type of mechanism, as shown in FIG. 1, a worm wheel 30 rotatably mounted in the base threadedly receives an axially movable feed actuating shaft 31 which is engaged with the lower arm of a crank member 32. The crank member 32 is pivotally mounted at 33 in an upstanding portion 10a of the base member 10 and has an upper arm engaged by piston rod 34. Piston rod 34 extends out through the opening 35 in base portion 10a and is connected to rapid advance piston 36 which is slidably received in cylinder sleeve 37 mounted in the wheelhead. Preferably the actuating mechanism 29 is wholly or partly mounted in a compartment 28 in the base totally enclosed except for the opening 35.

Each extreme limit of pivotal movement of the wheelhead relative to the base may be defined through control of the actuating mechanism or by a mechanical stop member. There is shown in FIG. 1 two opposing stop buttons 38 and 39 mounted on the upstanding portion 10a of the base to straddle the inturned lower flange 40 of the wheelhead. The buttons 38 and 39, by engagement with buttons on the flange, determine, respectively, the extreme forward position of the grinding wheel (or extreme counterclockwise movement of the wheelhead) and the extreme retracted position of the grinding wheel (or extreme clockwise position of the wheelhead). Rapid initial forward movement of the grinding wheel is effected by the application of fluid under pressure to chamber 41 to raise the wheelhead to the position shown in FIG. 1. Thereafter, rotation of worm wheel 30 by a motor driven worm (not shown) feeds shaft 31 to the right to slowly advance the grinding wheel into the work. The release of pressure from chamber 41 and reverse rotation of worm wheel 30 returns the wheelhead to its retracted position.

In order to protect the motion transmitting mechanism extending between the grinding wheel and the base from the grit of the grinding operation, an effective seal must be provided between the wheelhead 17 and the base 10 around the openings 25 and 35 in the wheelhead and base through which the mechanism extends. A well for fluid in base 10 is defined by a trough 45 having two parallel longitudinal legs 45a, 45b straddling opening 35 joined to two parallel cross legs 45c, 45d straddling opening 35 to constitute an endless, or continuous, trough surrounding opening 35. The trough 45 is defined by an upstanding continuous wall 46 completely surrounding the opening 35 and an upstanding continuous flange 47 spaced outboard from wall 46 and completely surrounding the wall 46. A continuous skirt 48 connected to the wheelhead 17 completely surrounds the opening 25 in the wheelhead and depends into trough 45. When the trough is filled with sufficient fluid so that skirt 48 remain immersed in fluid in any position of the wheelhead 17 relative to the base 10 between the extreme limits of movement of the wheelhead, a completely effective liquid seal is provided which, despite relative movement between the members 17 and 10, will protect the actuating mechanism 29 from the grit of the grinding operation. The walls and top of wheelhead compartment 24 and the wheelhead skirt 48 in effect define a closure for base opening 35 which isolates the grinding wheel 19 from the interior of the base 10 and therefore keeps the grit of the grinding operation from the interior of the base.

Even if grit gets into the trough, it is trapped by the fluid therein and cannot work its way out of the trough into base opening 35. However, the grit forms sludge in the trough and, to minimize the amount of grit which initially gets into the trough, a second skirt 49 is provided. This skirt, which completely surrounds the upstanding flange in spaced relation thereto, is also connected to the wheelhead and, with the first skirt 48, straddles the flange 47 to shield the trough from grit resulting from the grinding operation.

The trough 45 is supplied with fluid from sump 51 which has mounted thereon a pump 52, a motor 53 to drive the pump, and a filter 54 through which fluid from the sump taken by the pump passes. The fluid is pumped through line 55 containing rate control valve 56 to a gooseneck passage 57 in upstanding flange 47. The gooseneck passage, which terminates at trough inlet opening 58 at the bottom of the trough, prevents emptying of the trough, which is higher than the sump, in the event the pump shuts off.

In order to prevent accumulation of sludge in trough 45 from grit which works its way under skirt 49 and into the trough, fluid is continuously delivered into the trough from the inlet opening 58 at the bottom thereof. The top of upstanding flange 47 is below the top of wall 46 and the fluid therefore continuously flows over the top of flange 47 to flush grit out of the trough. This overflow spills into a gutter 59 surrounding flange 47 and connecting by drainage trough 60 to the sump. A removable plug 61 in flange 47 permits drainage of fluid from trough 45 for removal of any sludge not flushed out by the continuous circulation of fluid during operation of the machine.

The fluid circulated through the trough may be the same fluid which serves some other function in the machine. The fluid in sump 51 is a coolant fluid and, as shown in FIG. 3, the pump 52 is connected by line 62, containing flow control valve 63, to a coolant discharge nozzle 64 (see FIG. 1) connected to wheelhead 17 for delivery of coolant to the grinding operation.

The adaptability of the seal provided in the present invention to members having different types of relative movement is illustrated by the grinding machine shown in FIG. 5. In this machine the wheelhead 70 slides on base 71, instead of rocking relative thereto, to advance and retract the grinding wheel 72 carried by the wheelhead relative to a workpiece 73. The base has an actuating screw 74 mounted therein which is in threaded engagement with a depending portion 70a of the wheelhead. The depending portion 70a of the wheelhead extends through an opening 75 in the base. As in the machine previously described, a continuous fluid trough 76 in the base completely surrounds the opening 75 in the base and a continuous skirt 77 on the wheelhead extends into the trough and below the level of fluid therein. The skirt remains immersed in the fluid in any position of the wheelhead between an extreme retracted position, as shown, and an extreme advanced position as indicated by dotted lines. Thus the skirt and fluid containing trough define a seal continuously effective during the entire grinding operation. As in the embodiment previously described, a second continuous skirt 78 surrounds the outer wall of the trough to minimize entry of grit into the trough.

I claim:

1. In a machine tool for performing an operation on a workpiece, said machine tool having a base member and having a movable member mounted on the base member for reciprocating movement between two extreme positions relative thereto during said operation, a trough for fluid in the base member completely surrounding the movable member, the outer boundary of said trough defined by a continuous upstanding flange, and an inner skirt and an outer skirt connected to and extending around the movable member in spaced relation to straddle said flange, said inner skirt extending below the level of fluid in the trough in any position of the movable member between said two extreme positions to define a seal between said base member and said movable member and said outer skirt extending over the flange to minimize entry of foreign matter into the trough, and a source of fluid to cool the operation on the workpiece, said source connected to the trough to supply fluid thereto.

2. In a machine tool having a base member and having a movable member mounted on the base member for movement between two extreme positions relative thereto, a trough for fluid in the base member completely surrounding the movable member, the outer boundary of said trough defined by a continuous upstanding flange, means defining a gutter outside the flange and surrounding said trough, a skirt connected to and extending around the movable member, said skirt extending below the level of fluid in the trough in any position of the movable member between said two extreme positions to define a seal between said base member and said movable member, an inlet at the bottom of the trough, and a pump to continuously supply fluid under pressure to said inlet to continuously flush foreign matter over said flange into said gutter.

3. In a machine tool having a base member and having a movable member mounted on the base member for movement between two extreme positions relative thereto, a trough for fluid in the base member completely surrounding the movable member, the outer boundary of said trough defined by a continuous upstanding flange, means defining a gutter outside the flange and surrounding said trough, an inner skirt and an outer skirt connected to and extending around the movable member in spaced relation to straddle said flange, said inner skirt extending below the level of fluid in the trough in any position of the movable member between said two extreme positions to define a seal between said base member and said movable member, said outer skirt extending over the flange to minimize entry of foreign matter into the trough, an inlet at the bottom of the trough, and a pump to continuously supply fluid under pressure to said inlet to continuously flush any foreign matter which may enter the trough over said flange into said gutter.

References Cited in the file of this patent

UNITED STATES PATENTS

| | | |
|---|---|---|
| 1,910,649 | Svebelius | May 23, 1933 |
| 2,730,845 | Ernst | Jan. 17, 1956 |
| 2,744,731 | Brandt | May 8, 1956 |
| 3,030,692 | Raynes | Apr. 24, 1962 |